3,729,379
HYDROXY-CONJUGATED FATTY ACIDS
Edward A. Emken, Peoria, Ill., assignor to the United States of America as represented by the Secretary of Agriculture
No Drawing. Filed Aug. 31, 1971, Ser. No. 176,753
Int. Cl. C12b 1/00
U.S. Cl. 195—30                              3 Claims

ABSTRACT OF THE DISCLOSURE

Method for producing hydroxy-conjugated fatty acids from linoleic acid soaps dispersed in an aqueous medium containing dimethyl sulfoxide with the enzyme soybean lipoxygenase.

---

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This invention relates to a method of producing hydroxy-conjugated octadecadienoic acid from linoleic acid contained in vegetable oils and soap stocks from alkali-refined vegetable oils.

As early as 1946 Bergstrom, Arkiv Kemi 21:15, showed that the enzyme lipoxygenase catalyzed oxidation of linoleic acid present in vegetable fats. This oxidation resulted in the production of 9-hydroperoxy-10,12-octadecadienoic and 13-hydroperoxy-9,11-octadecadienoic acids. These two acids and any corresponding positional isomers will be known herein as hydroperoxy-conjugated octadecadienoic acids, and the hydroxy compounds to which the above have been reduced will be known herein as hydroxy-conjugated octadecadienoic acids.

Commercial interest in hydroxy-conjugated octadecadienoic compounds is due to the variety of reactions of which they are capable. The hydroxy group is easily converted to a number of other functional groups while many reactions are known for the conjugated diene system. The reactivity of the system is enhanced by the proximity of the hydroxy group to the diene system.

Two relatively simple reactions can be conducted that result in industrially important compounds; catalytic hydrogenation to form hydroxy stearic acid and dehydration to form conjugated octadecatrienoic acids similar to tung oil acids. Hydroxy stearic acids made by hydrogenating castor oil are used commercially in the manufacture of greases and as plasticizers while tung oil acids are useful as drying and crosslinking agents. The high prices of these commercially used products and the fact that most tung oil is imported make the instant compounds desirable as substitutes.

Other compounds having properties similar to the hydroxy-conjugated octadecadienoic acids and their derivatives are currently used in plasticizers, emulsifiers, drying oils, hydraulic fluids, lubricants, and chelating agents.

Although the lipoxygenase oxidation of linoleic acid has been known for some time, it has remained essentially an analytical method. The procedure requires a dilute 10 percent aqueous ethanol solution containing from $2 \times 10^{-3}$ to $2 \times 10^{-4}$ g. ($7 \times 10^{-6}$ to $7 \times 10^{-7}$ moles)/ml. of linoleic acid and about 10 µg./ml. of a relatively expensive purified lipoxygenase enzyme. When this standard procedure is conducted with $4 \times 10^{-3}$ to $40 \times 10^{-3}$ g. of linoleic acid and 50 to 120 µg. of purified lipoxygenase per milliliter of 10 percent aqueous ethanol, only 15 percent to 7 percent oxidation occurs.

In order for hydroxy-conjugated octadecadienoic compounds to be of commercial value, they must be produced in sufficient quantities from relatively inexpensive starting materials. In accordance with this object, I have discovered a method of producing hydroxy-conjugated octadecadienoic acids which comprises dispersing linoleic acid soaps in an alkaline medium containing from 10 to 20 volume percent dimethyl sulfoxide (DMSO), and reacting the soaps with oxygen in the presence of soybean lipoxygenase enzyme to form hydroperoxy-conjugated octadecadienoic acid soaps. The reaction must be stirred at a rate sufficient to form a foamy solution equal to about twice the initial volume of the reaction mixture. The ratio of linoleic acid soaps to enzymes (substrate/enzyme, S/E) is from about 80 to about 2,000 mg. linoleic acid soaps per 14,000 units of soybean lipoxygenase enzyme. The preferred enzyme preparation is defatted soy flour or an aqueous extract of defatted soy flour. The hydroperoxy-conjugated compounds produced from the reaction described above are reduced to their corresponding hydroxy compounds by appropriate chemical or catalytic means. The reaction medium is then acidified, and the resulting hydroxy-conjugated octadecadienoic acids (HOCD) are recovered. When linoleic acid-containing vegetable oils or soap stocks are used as starting materials, the instant compounds can be recovered in substantially purified form or in a mixture with other fatty acids.

Substantial improvements in yields of the instant compounds from reaction media containing high substrate concentrations can be obtained with the addition of antioxidants such as butylated hydroxy toluene (BHT) and alpha-tocopherol.

DETAILED DESCRIPTION OF THE INVENTION

The ability of the instant method to accomplish the objects of producing high yields (75 percent to 95 percent) from relatively concentrated solutions of starting material (up to 10 percent by weight) in times as short as 20 minutes using minimum amounts of enzyme (S/E up to 2,000) depends on a combination of proper choice of lipoxygenase enzyme source, reaction media, and technique.

The substrate for the enzymatic reaction is linoleic acid soaps, soaps being defined herein as the salts of a fatty acid with an alkali or metal. These linoleic acid soaps may be in purified form or in mixtures such as saponified soybean (SBO) or safflower oil (SFO). The preferred starting materials from an economic standpoint are soap stocks resulting from the alkali-refining of vegetable oils. Soap stocks are commercially available at a low cost and contain up to 50 percent linoleic acid soaps. When starting with fatty acids, the preferred procedure is to neutralize them prior to dispersion in the reaction medium. However, the acids can be neutralized during dispersion if the medium is sufficiently alkaline. The preferred bases for the saponification reaction are potassium, sodium, and ammonium hydroxide.

Soybeans are the richest source of lipoxygenase currently known, and commercially purified products are readily available. Lipoxygenase catalyzed oxidations described in the prior art almost always use the purified product because of its high activity especially in analytical methods. However, when higher concentrations of substrate were reacted with purified enzyme, only small quantities of oxidized materials were produced. It was surprising, therefore, when I discovered that the enzyme contained in defatted soy flour catalyzed the oxidation of linoleic acid soap to a degree of over six times that of the commercially purified lipoxygenase under identical reaction conditions. When the same reaction was repeated with an aqueous extract of defatted soy flour, the substrate was oxidized to an even greater extent.

Commercially purified lipoxygenase used in the examples [assayed by standard procedures as described by Tappel, Methods Enzymol. 5: 539–542 (1962)] had an activity of 14,000 units/mg., while defatted soy flour (DSF) and an aqueous extract of defatted soy flour (EDSF) prepared as described in Example 1 (infra) and assayed as described by Tappel (supra) had activities of 35,000 units/g. and 3,500 units/ml., respectively. Substrate to enzyme ratios (S/E) are defined herein as milligrams of linoleic acid soaps (either as pure substance or as that amount contained in a mixture) per 14,000 units of enzyme activity.

When linoleic acid soaps at a concentration of 4 mg./ml. of 10 percent ethanol were reacted with oxygen in the presence of DSF and EDSF at an S/E of 80 for 15 min., 87 percent and 93 percent of the soaps were oxidized, respectively. Extent of oxidation is calculated from the percent of linoleic acid soaps remaining in the reaction medium after the reaction has stopped. When the concentration of substrate was increased to 100 mg./ml. (10 percent solution by weight) and S/E (DSF) was increased to 200, only 73 percent of the soaps were oxidized in 30 minutes. When S/E was increased to 1,000 with a substrate concentration of 100 mg./ml., the extent of oxidation after 30 minutes was only 40 percent. However, I subsequently discovered that replacing the ethanol in the reaction medium with DMSO increaesd the extent of oxidation from 40 percent to 75 percent. DMSO was replaced by other aprotic solvents such as tetrahydrofuran, pyridine, dimethyl formamide, dioxane, acetyl nitrite, and acetone, but essentially no oxidation product (HOCD) could be recovered. Other solvents may give this same effect but of those solvents studied, only DMSO increased the extent of oxidation and produced high yields of HOCD.

At a substrate concentration of 100 mg./ml. of 20 percent DMSO and a reaction time of 30 minutes, the extent of oxidation drops from 95 percent to 75 percent to 55 percent as S/E (DSF) increases from 500 to 1,000 to 2,000. However, allowing reaction mixtures having an S/E of 2,000 to proceed for up to 50 to 60 minutes results in from 70 to 75 percent oxidation, and reactions having S/E's of 500 to 1,000 result in 85 to 80 percent oxidation. Oxidation rates in 10 percent aqueous DMSO were only slightly less than those in 20 percent DMSO.

Contrary to what is taught by the prior art, incorporation of antioxidants into reaction media containing high substrate concentrations improves the yields of oxidation products. Additions of BHT and alpha-tocopherol increased the yields of linoleic oxidation products from SFO soaps by 4 to 15 percent and reduced reaction time need to obtain 90 percent yields from SBO soaps from 10 percent to 25 percent.

The third important aspect of the method, after choice of enzyme source and proper reaction media, is in the area of technique. In order to achieve the desired high yields it is deemed highly advantageous to disperse the soaps into the reaction medium as completely as possible before adding the enzyme and, of even more importance, the rate of oxygen flow and stirring must be sufficiently vigorous to produce a foaming solution that is about twice the initial volume of the reaction mixture. This last criterion is in direct contrast to the teachings of the prior art. It has been taught that the addition of an antifoaming agent is necessary for the reaction to properly take place because foaming rapidly denatures lipoxygenase, Bergstrom and Holman, "Advances in Enzymology," vol. 8, F. F. Nord, ed., Interscience Publishers, New York, 1948, pp. 425–457. In oxidations conducted as described above in which a commercial antifoaming agent was added to prevent foaming, the reactions were sluggish, quickly became inhibited, and resulted in less than 10 percent to 15 percent oxidation.

Other reaction parameters were studied to determine if they could cause any major changes in reaction rates.

The preferred temperatures are between 25° and 30° C. Reactions run at 0° and 15° C. were sluggish while those run at about 40° C. gave low yields.

Phosphate, borate, and ammonium hydroxide-ammonium chloride buffer systems were used. The different counter ions had no observable effect on the reaction rates. Mixtures having a buffered pH of 9 to 10 gave the best yields of hydroperoxy-conjugated dienes. The rate of oxygen uptake did not depend on pH, but when pH levels were low, extensive decomposition of the hydroperoxy compound occurred. Also high pH levels ensure the neutralization of all the fatty acids, help to improve the dispersion of the soaps, and help prohibit the decomposition of hydroperoxides.

In situ reduction of hydroperoxy-conjugated dienes to their corresponding hydroxy-conjugated dienes accomplished by the use of sodium borohydride was the preferred method. However, ex situ reductions with these reactants or with sodium bisulfite, stannous chloride, potassium iodide, or catalytic reduction with nickel will yield hydroxy acids from the hydroperoxy-conjugated dienes.

Hydroxy-conjugated octadecadienoic acids are easily recovered from the reaction mixture and from other reaction products by several means. Samples containing as high as 80 percent hydroxy-conjugated diene were recovered by a one-stage liquid-liquid extraction of the reaction medium with ether, chloroform, or n-butyl alcohol. Essentially pure products are obtained by silicic acid chromatography and countercurrent distribution. Preparative gas-liquid chromatography (GLC) is used to prepare small very pure samples.

Ultraviolet spectra of the isolated hydroxy-conjugated octadecadienoic acids were used to identify the product and to calculate percent of the product, HOCD, in sample mixtures. An extinction coefficient of 27,063 at a $\lambda_{max}$ of 233 nm. were used for the calculation. GLC's of the silylated reaction products were also used for identification and calculation. The silylated oxidized SBO acids contained about 5 percent conjugated dienoic acids, linolenic acids, and hydroxy-octadecatrienoic acids containing a conjugated dienol system.

The following examples are intended only to further illustrate the invention and should not be construed as limiting the invention's scope.

EXAMPLE 1

(A) Preparation of defatted soy flour (DSF) containing active lipoxygenase

Defatted soy flour was prepared in the laboratory by cracking 1.2 kg. of 1968 certified Hawkeye soybeans (10–30 mesh). The cracked beans were extracted by mixing with 2 l. of hexane and allowing the mixture to stand for 1 hour. The hexane was then decanted, 1 l. of hexane added, and the mixture allowed to stand for 72 hours. The hexane was then removed by filtration through a Buchner funnel and the meal dried under vacuum. The dried meal was ground to a flour in a hammer mill and extracted three times with 1.5 l. portions of hexane. The mixture was set aside for 4 hours after each addition of hexane and then filtered. After drying the residue under vacuum approximately 1 kg. of defatted soy flour was recovered and stored at 3° C. until needed for use per se or in making the aqueous soy flour extract.

(B) Preparation of extracted defatted soy flour (EDSF)

Crude aqueous soy flour extracts were freshly prepared when needed by extracting defatted soy flour with 0.05 M (pH 10) borate-KOH buffer. The general procedure involved stirring 4 g. of defatted flour with 40 ml. of buffer for 5 minutes and then centrifuging at 10,000 r.p.m. for 2 minutes. About 25 ml. of clear extract could be decanted from the sediment. This crude extract was further purified for use in the standard lipoxygenase assay method by adding 2.5 ml. of a 64 mg./ml. $CaCl_2$ solution, centrifuging at 10,000 r.p.m. for 3 minutes and decanting the clear extract. The activity of the $CaCl_2$-purified soy flour extract was compared with NBC-purified lipoxygenase by using the standard lipoxygenase assay procedure. Comparison of crude aqueous soy flour extract and $CaCl_2$-purified soy flour extract demonstrated that they were almost identical in activity.

(C) Substrate preparation

Safflower acids (SFO) containing 75 percent linoleic acid were prepared by saponifying safflower triglycerides and then distilling the free acids at reduced pressure.

Crude soybean (SBO) soaps from alkali-refined soybean oil, prepared from acidulated SBO acids furnished by Swift & Co., contained 52 percent linoleic acid. Titration with aqueous methanolic potassium hydroxide showed that the crude acidulated SBO acids contained 88 percent free fatty acids.

(D) Lipoxygenase-oxidation procedure

Fatty acids (5 g.) were dissolved in a measured amount (10 ml.) of DMSO or 95 percent ethanol. The fatty acids were then neutralized by using a 5 to 10 percent molar excess of 1 to 1.5 N ammonium, potassium or sodium hydroxide. The base was added slowly with vigorous stirring. As the solution became viscous during the addition of the base, ca. 5 ml. of pH 10 buffer was added to thin the mixture. Next, a measured amount of 0.05 M borate, phosphate or ammonium chloride-ammonium hydroxide buffer of pH 9–10 was added. The solution was stirred for 15 to 30 minutes under a stream of oxygen. Stirring was stopped and the lipoxygenase source added. The manometric system, an automatic gas-pressure controller and volume recorder used to measure and record the rate of oxygen uptake, was checked for leaks, the magnetic stirrer started at 80 to 90 percent of full speed, and the rate of oxygen uptake recorded.

The reaction was stopped by adding enough 95 percent ethanol to increase the reaction volume 20 percent. The hydroperoxides in the reaction mixture were reduced with an equal molar amount of $NaBH_4$. Addition of diethyl ether helped control foaming during the reduction with $NaBH_4$. The solution was stirred for 1.5 hours after addition of $NaBH_4$ and then filtered through Celite in those experiments where defatted soy flour had been used as the enzyme source. No filtration was necessary when aqueous soy flour extracts were used. The reduced solution was acidified to pH 3 with dilute HCl and extracted four times with diethyl ether. An initial emulsion was usually formed and was broken by adding diethyl ether, petroleum ether and additional ethanol. The ether extracts were washed until neutral and dried over sodium sulfate. The ether was evaporated under reduced pressure and the final traces of solvent were removed under a stream of nitrogen. Actual recoveries were usually 90 to 95 percent of the total soap stock added unless some of the hydroperoxides decomposed before $NaBH_4$ reduction.

In some experiments results were similar when chloroform or n-butyl alcohol was used to extract the oxidized fatty acids from the reaction mixture.

The effects of using the different substrates and enzymes in varying concentrations and ratios are recorded in Table 1.

TABLE 1

| Source | Conc., mg./ml. | Enzyme source | S/E | Reaction medium | Extent of oxidation, percent [1] |
|---|---|---|---|---|---|
| SFO | 4 | PL [3] | 80 | 10% EtOH | 12 |
| SFO | 4 | DSF | 80 | 10% EtOH | 87 |
| SFO | 4 | EDSF | 80 | 10% EtOH | 93 |
| SFO | 4 | DSF | 200 | 10% EtOH | 97 |
| SFO | 10 | DSF | 200 | 10% EtOH | 93 |
| SFO | 100 | DSF | 200 | 10% EtOH | 73 |
| SFO | 100 | PL | 500 | 20% DMSO | 22 |
| SFO | 100 | DSF | 500 | 20% DMSO | 95 |
| SFO | 100 | EDSF | 500 | 20% DMSO | 85 |
| SFO | 100 | DSF | 1,000 | 10% EtOH | 40 |
| SFO | 100 | DSF | 1,000 | 20% DMSO | 75 |
| SFO | 100 | DSF | 667 | 20% DMSO | 77 [2] (84) |
| SFO | 100 | DSF | 1,000 | 20% DMSO | 75 (82) |
| SFO | 100 | DSF | 2,000 | 20% DMSO | 55 (70) |
| SBO | 100 | DSF | 400 | 20% DMSO | 89 |
| SBO | 100 | EDSF | 400 | 20% DMSO | 91 |

[1] 30 minutes reaction time.
[2] 50 minutes reaction time (figures in parentheses).
[3] PL, purified lipoxygenase (commercial).

EXAMPLE 2

Oxidations were conducted as described in Example 1 except that 0.3 percent, based on total weight of all fatty acid soaps present, alpha-tocopherol or 0.75 percent butylated hydroxy toluene antioxidants were added to the reaction mixture before the enzyme. The results of these reactions were compared to those from identical reactions having no antioxidants, Table 2.

TABLE 2

| Antioxidant, percent | Substrate source | Conc., mg./ml. | Enzyme source | S/E | Reaction time, min. | HOCD, percent | Oxidation, percent |
|---|---|---|---|---|---|---|---|
|  | SBO | 100 | DSF | 400 | 25 | 36 | 88 |
| BHT, 0.75 | SBO | 100 | DSF | 400 | 18 | 44 | 88 |
|  | SBO | 100 | EDSF | 400 | 20 | 45 | 88 |
| BHT, 0.75 | SBO | 100 | EDSF | 400 | 18 | 47 | 91 |
|  | SFO | 100 | DSF | 1,000 | 45 | 48 | 71 |
| α-Tocopherol, 0.3 | SFO | 100 | DSF | 1,000 | 45 | 52 | 74 |
| BHT, 0.75 | SFO | 100 | DSF | 1,000 | 45 | 64 | 84 |
|  | SFO | 100 | EDSF | 1,000 | 45 | 52 | 75 |
| BHT, 0.75 | SFO | 100 | EDSF | 1,000 | 45 | 63 | 83 |

I claim:

1. A method of producing hydroxy-conjugated octadecadienoic acids which comprises dispersing linoleic acid soaps in an alkaline aqueous medium containing from 10 to 20 volume percent dimethyl sulfoxide; reacting said linoleic acid soaps with oxygen with stirring sufficient to form a foamy solution equal to about twice the initial volume of the reaction mixture in the presence of soybean lipoxygenase enzyme to form hydroperoxide-conjugated octadecadienoic acid soaps, the ratio of linoleic acid soaps to enzyme being from about 80 to about 2,000 mg. of linoleic acid soaps per 14,000 units of soybean lipoxygenase enzyme, said enzyme being contained in defatted soy flour or in an aqueous extract of defatted soy flour; reducing said hydroperoxide-conjugated octadecadienoic acid soaps to their corresponding hydroxy compounds by chemical or catalytic means; acidifying the reaction medium; and recovering the resulting hydroxy-conjugated octadecadienoic acids.

2. A method of producing hydroxy-conjugated octadecadienoic acids as described in claim 1 in which the linoleic acid soaps are contained in saponified vegetable oils or in soap stocks resulting from alkali-refined vegetable oils.

3. A method of producing hydroxy-conjugated octadecadienoic acids as described in claim 1 in which the alkaline aqueous medium contains an effective amount of an antioxidant comprising butylated hydroxy toluene or alpha-tocopherol.

References Cited

Veldink et al.: Biochim. Biophys. Acta, vol. 202, pp. 198–199, 1970.

A. LOUIS MONACELL, Primary Examiner
G. M. NATH, Assistant Examiner

U.S. Cl. X.R.

195—114